July 22, 1958
V. F. ZAHODIAKIN
2,843,907
FASTENING DEVICES
Original Filed Sept. 2, 1952
2 Sheets-Sheet 1
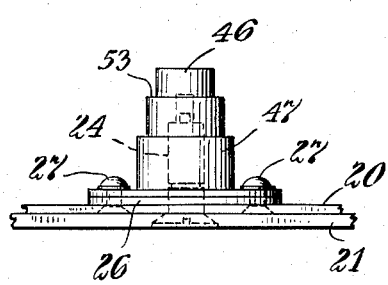
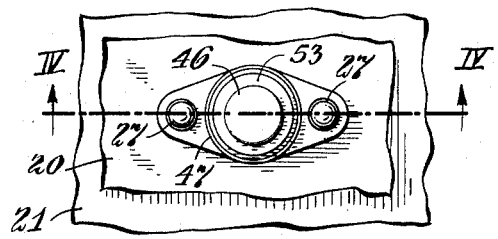
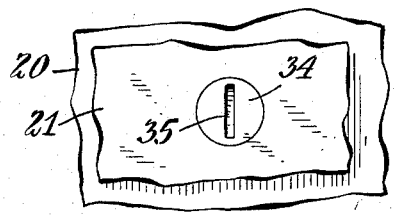
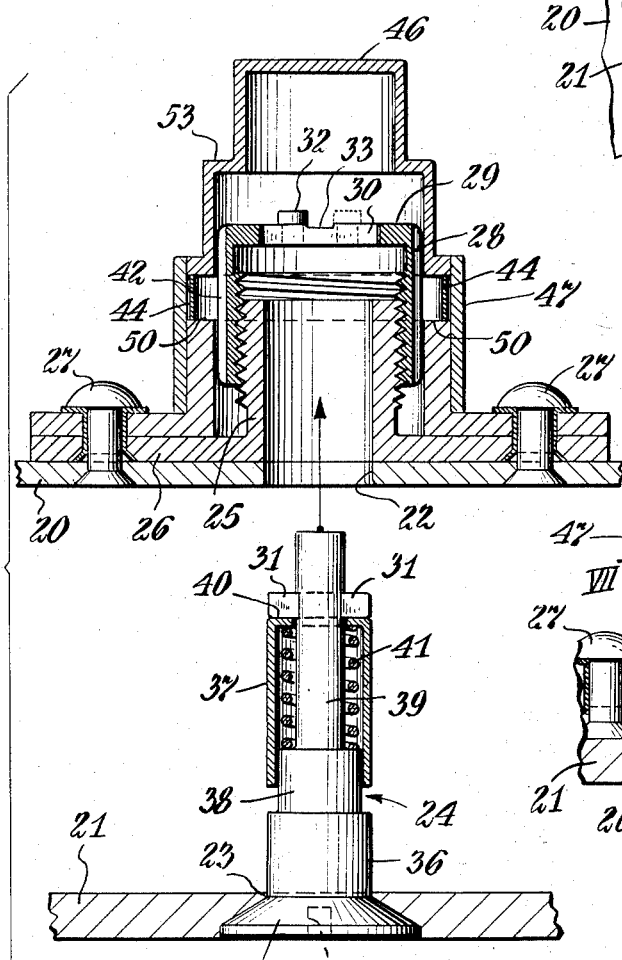
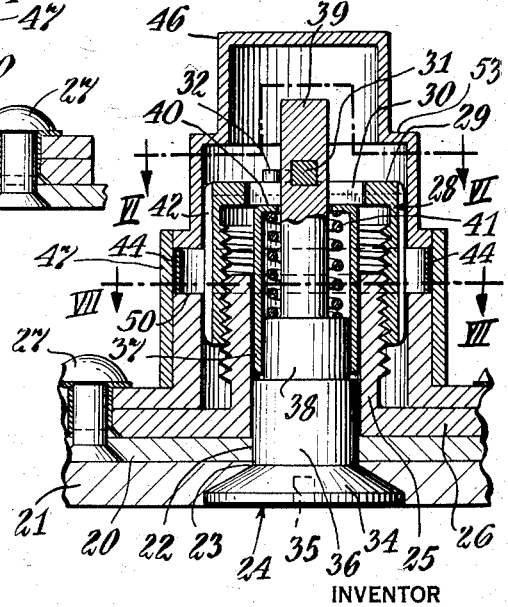
INVENTOR
VICTOR F. ZAHODIAKIN.
BY Howard P. Kane
ATTORNEY July 22, 1958 — V. F. ZAHODIAKIN — 2,843,907
FASTENING DEVICES
Original Filed Sept. 2, 1952 — 2 Sheets-Sheet 2
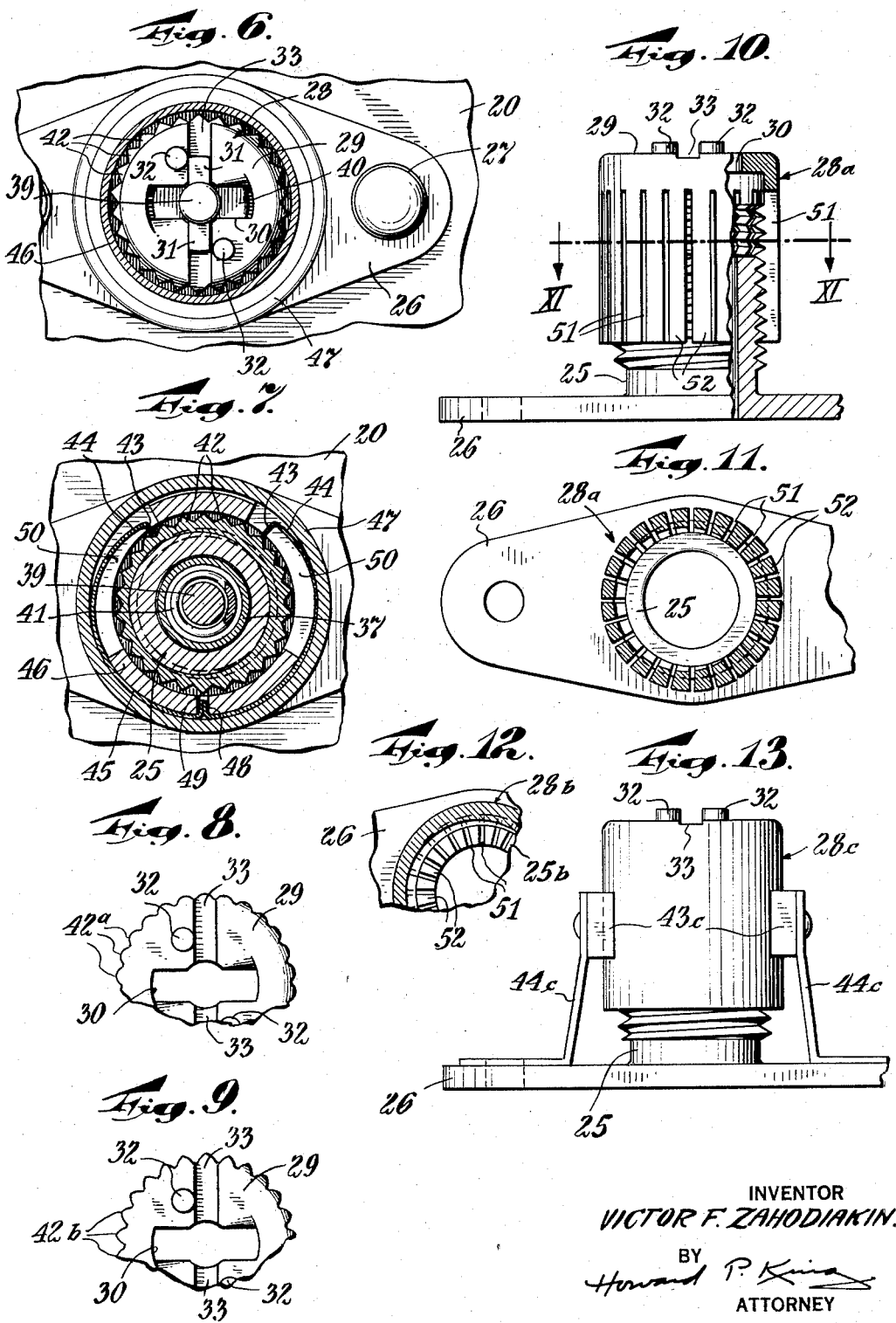
INVENTOR
VICTOR F. ZAHODIAKIN.
BY Howard P. King
ATTORNEY

United States Patent Office 2,843,907
Patented July 22, 1958

2,843,907

FASTENING DEVICES

Victor F. Zahodiakin, Summit, N. J.

Continuation of abandoned application Serial No. 307,432, September 2, 1952. This application February 7, 1956, Serial No. 563,911

22 Claims. (Cl. 24—221)

This is a continuation of my prior application S. N. 307,432 filed Sept. 2, 1952 for Fastening Device, now abandoned. The invention relates to a rotary type fastening device, and more particularly to the quick locking stud and socket type which obtains an interlock by engaging the stud with a socket by means of twisting the stud.

While the most common means for releasably holding members together is the common bolt and nut, there have been many efforts to improve thereover with stud and socket type of fasteners, but they have not been completely satisfactory for many reasons of which one is inability of a single fastener to be usable under various conditions without complications and difficulty for releasing the members or locking the same satisfactorily.

Fastening devices of this character find extensive use in airplanes and elsewhere, for such specific purposes as securing the fuselage, compartments, brackets, hinges and other parts and devices and for fulfilling multitudinous requirements too numerous to be cataloged herein. But suffice it to say, that heretofore a great assortment of sizes of fastening devices has been required, and this largely due to the fact that fasteners of the prior art were made to accommodate definite thicknesses and/or number of elements to be clamped, a different fastener being required for each condition encountered.

Furthermore, an inherent defect of prior art fastening means, often necessitating reversion to use of the time consuming bolt and nut, has been the development in some installations of lateral or tilting deflection of the stud when subjected to shear loads. Such deflection has been one of the principal causes of the prior art fastening devices opening or becoming inadvertently dislodged, and cause of opening or dislodgement has been aggravated by, or independently effected, by excessive vibration to which the members are at times subjected in use.

Also, prior art devices have provided no compensation for wear, and have, in fact, added to the probability of wear. While some, at least, of these difficulties may be overcome by use of an ordinary bolt and nut and lock-washer, such substitution is a step backward, rather than forward, and a quick fastening device is still desired in preference to tedious and sometimes impractical application of bolts and nuts. Almost invariably quick fastening devices of the prior art have depended upon spring tension or compression sustaining the load applied to the device, and due to fatigue, heat or other causes, the spring loading has varied and often failed utterly through breakage, disruption, or otherwise, and when the spring fails or becomes impaired in such devices, the fastening device loosens and usually opens.

It is a well known fact that in order to decrease wear of parts, the hardness of the material should be at maximum degree, and yet, in fastening devices of the present day which incorporate springs for receiving the load, the spring element cannot be hardened to a maximum degree because it will become brittle, and therefore when admissible hardness is provided, the article may wear rapidly, or under excessive strain will be bent. But by utilizing the construction of device of my invention as will be hereinafter more fully set forth, which does not depend upon a spring to carry the axial or lateral load, the highest degree of hardness of the metal parts can be employed, whereby the usual wear is eliminated. It is therefore one object of the invention that no deflection in the device be permitted and therefore separation of clamped members at any load will be made impossible, so long as the load is not in excess of the tensile strength of materials employed. It is further inherent to the invention that no lateral movement of clamped members under shear load shall be possible as long as the shear load is not greater than the strength of material opposing the shear load. These qualifications are of great and paramount importance where large stresses are involved and applied rapidly, and as these conditions occur constantly in use and construction of present day high speed aircraft, the requirements cannot be met by any type of design of fastening devices of present day manufacture which absorb or carry the load by some type of spring.

In addition to the fundamental objectives referred to above, and having in mind the foregoing and other drawbacks and deficiencies of the prior art, it may be broadly stated that the present invention proposes an improved construction of fastening device.

Viewed further in its broadest aspects, the invention contemplates as an objective the provision of a fastening device which will be readily applicable and of a more universal character.

Another object of the invention is to provide a fastening device which will not become angularly displaced in use.

Closely related to the foregoing object is one proposing a structure which will not be opened either by application of shear stresses or by vibration.

A further object of the invention is to provide a fastening device which will accommodate and be readily adjustable to clamp a varying number and/or thicknesses of members to be clamped.

An essential object of the invention is to provide a fastening device which avoids interposing a spring between the gripping means and the members being clamped, or, in other words, one which avoids loading a spring with the load carried by the fastening device.

Yet another object of the invention is to provide a fastening device which will suppress wear between members being clamped and which can compensate for any wear that may occur.

Another object of the invention is to provide a fastening device which is applicable to members that have become somewhat distorted and which tends to straighten the members and grip them securely.

A further object of the invention is to provide a fastening device that requires no special tools and is readily applied and released when desired in the field.

Still further objects, advantages and results will become evident to persons skilled in the art to which the invention appertains as the description proceeds, both by direct recitation thereof and by implication from the context.

Referring to the accompanying drawings in which like numerals of reference indicate similar parts throughout the several views;

Figure 1 is an elevation of a fastening device embodying the invention and shown in position of use;

Figure 2 is a plan and Figure 3 is an underneath view of Fig. 1;

Figure 4 is a longitudinal section of the device in clamping condition, on line IV—IV of Fig. 2;

Figure 5 is a sectional view similar to Fig. 4, but showing the stud rotated 90° and released from the socket;

Figures 6 and 7 are cross-sectional views on lines VI—VI and VII—VII respectively of Fig. 4;

Figures 8 and 9 are fractional plans of modified constructions of serrations on the crown;

Figure 10 is a sectional elevation of a modified construction of detaining means and crown;

Figure 11 is a sectional plan taken on line XI—XI of Fig. 10;

Figure 12 is a sectional plan similar to Fig. 11 showing a further modification; and Figure 13 is an elevation of another modified construction of detaining means and crown.

In the specific embodiment of the invention illustrated in said drawings, the reference numerals 20, 21 designate two members adapted to be juxtaposed and clamped together by the fastening device of the present invention. These members are representative of any number and thickness of bodies to be clamped together. Said members have holes 22, 23 therein adapted to register with each other and intended to receive a stud 24 of the device more fully described hereinafter.

The fastening device comprises, as part of the socket portion thereof, a fixed cylinder 25 having a bore substantially the same diameter as and in registration with hole 22 of adjacent member 20. Said cylinder has an external flange 26 at its end next said member, said flange being riveted, as at 27, to said adjacent member 20. Said fixed cylinder is externally screw-threaded and adapted to receive thereover an internally threaded rotatable cylinder or adjustable crown 28. Said crown has an end wall 29 at its upper end, and centrally of said end wall is a slot or aperture 30 of appropriate size and shape to receive lateral protuberances or blades 31 projecting at diametrically opposite sides of the upper end portion of stud 24. The leading edges of this slot 30 at the upper surface of said wall are rounded to assist the protuberances to ride thereover.

Offset from the sides of the slot and projecting from said end wall 29 are two pins 32 situated respectively in the path of rotation of the protuberances or blades 31 to be engaged by said blades after said blades have passed upwardly through the slot 30 and rotated above said end wall. Diametrically across the upper face of the end wall 29, tangent at its opposite sides respectively with said pins 32, is a shallow groove 33 having the same width as the protuberances or blades 31 and here shown at right angles to the slot 30. The arrangement is such that when the protuberances have been rotated to engage the pins, said protuberances will then be in registration with said shallow groove and will settle thereinto. A spring, presently described, enforces this settling of the protuberances into the groove.

Continued rotation of the stud 24 after the protuberances or blades 31 engage the pins 32, effects rotation of the adjustable cylinder or crown 28, which, turning on its screw-threads, has longitudinal movement imparted thereto. Rotating the stud and crown in a direction unscrewing the crown from the fixed cylinder, and here referred to as clockwise, advances the end wall 29 in a direction toward the protuberances, ultimately clamping said protuberances unyieldingly in said grooves. With the protuberances thus held, they cannot inadvertently rotate backward to the slot and consequently the device will not become unintentionally released.

Considering the stud more in detail, the end of the same, opposite from the end having said protuberances, has a head 34 which underlies the outermost or bottom member 21. With the stud pulled inward by the advancement of the crown exerting pressure under the protuberances, said members 20, 21 are clamped tightly between the flange of the fixed cylinder 25 and the head of the stud. For rotating the stud, said head 34 thereof is shown provided with a kerf 35 for application of a screwdriver thereto. Adjacent the stud head 34 the shank of the stud has a cylindrical bearing portion 36 of substantially the same diameter as the bore of the fixed cylinder 25 so as to have a rotating fit therein. This bearing portion 36 will therefore oppose any shearing stresses between the plates or members 20, 21 and such shearing stresses cannot tilt the stud because of the fit of the said bearing portion in the holes through said members and because of the fit of said bearing portion within the fixed cylinder 25 and because of the unyielding tightness of the clamping.

Slidably mounted on the stud, above said bearing portion 36, is a hollow cylindrical sleeve 37 the outer diameter of which is substantially the same as said bearing portion so that said sleeve likewise will have a sliding fit in the hollow of the fixed cylinder 25. The shank of the stud 24 immediately above said bearing portion 36 is reduced in diameter sufficiently to fit within the marginal end portion of said sleeve and function as a sleeve guide 38. Above this guide, the shank of the stud has a further reduction in diameter to provide a stem 39 and it is at an upper part of this stem that aforementioned protuberances 31 are provided. According to the present showing, said protuberances are end portions of a square rod passing through the stem and projecting equally at opposite sides of the stem. Said sleeve extends toward said protuberances and on occasion may engage the same and be stopped thereby from sliding off of the stud; that end of the sleeve having a perforate end wall 40 making sliding contact with said stem.

A spring 41 surrounds the part of the stem 39 within the sleeve 37, one end of the spring seating against the inner end of the sleeve guide portion 38 of the stud and the other end of the spring seating against the perforate end wall 40 of the sleeve with the resilient compressive force tending to push the sleeve toward the protuberances. When the stud is not home in the socket, the sleeve responds to the spring pressure and seats against said protuberances. Upon introducing the stud into the socket, the stud is twisted until the protuberances find and enter slot 30 in the end wall 29 of the adjustable cylinder or crown 28, bringing the end wall of the sleeve into contact with the end wall of the crown, whereupon the operator pushes and rotates the stud. The pushing effects compression of the spring 41 and elevation of the protuberances 31 to a position above the end wall 29 of the crown 28 then permitting rotation of the stud to turn the protuberances out of registration from the slot and into lateral engagement with the pins 32. By limiting the sliding range of the sleeve to substantially the equivalent thickness of the end wall of the crown, the protuberances can be made to satisfactorily clear the end wall but no further, as a result of which pins 32 may be short and all lateral force applied against them when twisting the stud will be at or very close to the bottom of the projecting portions of the pins.

Inasmuch as the cross-bar protuberances 31 are seated immediately in the shallow groove 33 simultaneously with said protuberances coming into engagement with said pins 32 the edges of the groove supplement the pins in transfer of the forward torque applied by rotation of the stud. In reverse rotation of the stud for release thereof from the rotatable cylinder or crown 28, and since the rotatable cylinder has been advanced by the screw threads to its unyielding relation with the cross-bar studs, the releasing torque is applied through the protuberances to the side edges of the groove until enough play has been provided by the screw-thread retraction of the rotatable cylinder for the operator to push the stud far enough to raise the protuberances out of the groove. In addition to the reverse rotation which the operator must apply, a definite longitudinal push on the stud is required to overcome the spring tension which continues to hold the protuberances seated after the unyielding retention of the screw-thread clamping action is relieved due to the reverse rotation.

A feature of the invention is to provide locking means for thwarting inadvertent reverse rotation of the rotatable cylinder or crown. One such means is shown in Figures 4 to 7 inclusive. The rotatable cylinder or crown 28 is cut with a circular series of serrations or teeth 42 in its outer cylindrical surface, the individual teeth extending lengthwise of the cylinder so as to be equally effective at any position of advancement or retraction of said cylinder. Spring-loaded detents 43 are provided and adapted to ride over the peaks of the teeth and releasably seat in the valleys for detaining purposes. The detents illustrated are lips positioned radially of the rotatable serrated cylinder and bent ends of arcuate leaf-springs 44 each of which extends partially around the cylinder from substantially a common starting point with the two springs oppositely directed therefrom. Said springs are held fixed at their basal ends at and adjacent to said starting point, but the other ends having said detents are resiliently movable toward and away from the serrated rotatable cylinder and under inherent tension urging the detents toward the serrations.

A convenient means for holding said arcuate springs 44 is to include the same next their basal ends in an arcuate rabbet 45 in the outer face of a cap 46 surrounding the sides and upper end of the rotatable cylinder, said cap being fixed as by rivetting to the flange of the fixed cylinder. A ferrule 47 is slid over the outer surface of said cap at the part thereof having the rabbet, the ferrule holding the basal portions of the leaf springs in the rabbet. By utilizing a depth of rabbet equal to the thickness of the spring material, the spring will be held tightly thereby. The extremity of the basal end of the spring may have an inturned tab 48 seated in an opening 49 therefor in the wall of the cap, for purposes of keeping the spring from shifting longitudinally. Beyond the basal end of each spring and for an adequate length of the spring next the detent end thereof, a slot 50 is provided entirely through the wall of the cap 46 to afford resilient play of the spring and to admit the detent to contact with the serrations 42. The detents may be arranged, if desired, so that when one is located in a valley of the serrations, the other will be on the crest of another serration. Thus if there are one hundred serrations there will be two hundred positions in one revolution of the rotatable cylinder at which it may be detained. While in practice I provide one hundred serrations, the invention is not limited to number thereof and for clarity in the drawing a lesser number is shown. Likewise the interfitting threads between the two cylinders are actually very fine in practice, say one hundred to the inch, but again for clarity, the threads are shown much coarser than in the commercial article. Consequently in the device as made, a very high compression can be effected without requiring accuracy in the thickness or number of said members 20, 21 clamped thereby.

While Figures 6 and 7 furthermore show an arbitrarily selected type of serrations, readily recognizable in the drawing as saw-tooth configuration, it is to be understood that serrations shaped otherwise may be utilized. For instance, instead of straight-sided serrations, they may be convexly curved toward the peak, such as the full-round crests of the serrations 42a of Fig. 8, or may be a compromise between straight sided and full-round with more of a fluer-de-lis shape as shown in the serrations 42b of Fig. 9.

Other detaining means than the serrations and spring-loaded detents above described may be used, and Figures 10 and 11 show a modification of this character. The stud is identical with the views previously described and is therefore not again illustrated, the modification being with respect to the socket. In said Figures, fixed cylinder 25 shown has identical structure of the previously described device, with external threads, internal bore and attaching flange 26. The rotatable cylinder or crown, here identified by reference character 28a, has internal threads as before and has end wall 29, slot 30, shallow groove 33 and pins 32, all as previously described. Instead of having serrations, this rotatable cylinder has a circular series of parallel saw-cuts or slits 51 radially through the cylindrical wall of said cylinder and extending longitudinally upward from the bottom edge thereof. The metal of which said cylinder is made is of resilient character, and after the slits 51 have been cut, the prongs 52 resulting therefrom are sloped inward slightly and given a permanent set in that position. Then the resilient spreading of said prongs back to true cylindrical relation when screwed as a unit onto the fixed cylinder, will introduce a resilient grip or detention from inadvertent rotation of the rotatable cylinder 28a on the fixed cylinder. The same concept of resilient grip inherent to the cylinder assembly, is present no matter which cylinder has the slits, and thus in Fig. 12 there is a showing of an outer cylinder 28b without slits, but of course threaded, and an inner or fixed cylinder 25b with slits 51 and prongs 52 but in this instance with the prongs given a resilient set when bent slightly outward.

In the showing of Figure 13, the feasability of providing detaining means without either having serrations or having slits is illustrated. Here is again shown a fixed and threaded cylinder 25 with flange 26 as has been previously described. Threaded thereon is a rotatable cylinder or crown 28c having an outer surface without serrations or slits. Spring loaded detaining means is provided for engagement with said outer surface, the detents in this instance comprising frictional brake shoes 43c in contact with said surface. Leaf springs 44c fixed on flange 26 support said brake shoes and supply the resiliency pressing the shoes into detaining contact with the said rotatable cylinder and prevent its inadvertent reverse rotation.

The first time one of the herein described fastening devices is used at a given location, adjustment of more or less extensive longitudinal movement of the crown may be required to accomodate the particular number and thicknesses of members being clamped, but thereafter, on removal, only such rotation as needed to release the protuberances 31 from shallow groove 33 and to register said protuberances with the slot 30 will be given the stud 24 in releasing it, and a corresponding, but directionally reversed rotation, to again engage the protuberances in clamping condition. If necessary, the rotatable cylinder or crown 28 can be backed down an additional amount either by holding the protuberances in the slot and rotating the stud which in turn rotates the crown, or by removing the stud entirely and using a screw driver in the slot to rotate the crown. Whatever play is thus provided in releasing direction will be readily taken up when the members are to be again clamped by giving the additional rotations needed after the protuberances are again inserted and in over-riding position on the end wall 29. Warped members may thus be pulled together and clamped tightly.

Ordinarily for the initial installation, it is preferable to screw the crown 28 down upon the fixed cylinder 25 as far as deemed necessary to accommodate the number and thicknesses of members to be clamped so as to give ample leeway for the protuberances 31 to be pushed up above end wall 29 of the crown. With the crown thus retracted, the stud is inserted so that protuberances 31 enter slot 30 and are then forced inward against resistance of spring 41 as far as sleeve 37 permits, which brings the protuberances 31 above said end wall after which twisting of the stud rotates the protuberances into engagement with pins 32 and registration with groove 33, whereupon discontinuance of pushing pressure on the stud enables spring 41 to seat the protuberances in said groove. The stud is rotated further after such engagement of the protuberances with the pins and seating in the groove, thereby rotating the crown on its threads and obtaining longitudinal movement of the crown in an extending direction drawing the stud inward and pulling the stud head 34 tighter against the outer member 21 and clamping the members together. During this rotation, the detents 43 function as a ratchet, and when the stud is tight with the protuberances seated in the groove, one detent will be seated in one of the serration valleys keeping the crown from turning backward until an applied force of adequate torque is purposely exerted for intentional release. It may also be said at this time, that torque required to rotate the rotatable cylinder in opposition to the detention imposed by the detents 43 is greater than the torque required to rotate the protuberances on the upper surface of the end wall 29 of said rotatable cylinder. The cylinder consequently will not rotate until the protuberances are rotated into engagement with pins 32. To avoid the possibility of the rotatable cylinder being screwed outwardly so far that it might become disengaged from the screw-threads of the fixed cylinder, cap 46 may be stepped inwardly at an appropriate elevation to provide a stop 53 in the path of outward movement of said rotatable cylinder 28.

In conclusion, I wish to point out that the construction of fastening device herein described may be characterized as of universal type in that one size only need be stocked for use with members to be clamped included within a wide range of numbers and thicknesses of such members. The device affords a positive clamping through the agency of unyielding or solid metal parts having no interposed resiliency, providing great strength and ability to withstand far greater loads than known fastening devices of the prior art of the quick-fastening type. Since the compression is obtained by screw threads having fine pitch and functioning in conjunction with solid practically non-compressible metal parts which are non-resilient under the clamping pressure, clamping ability of the device attains a maximum and the device when thus clamped will withstand extremely high lateral loads with zero deflection within the device or between the clamped members. Since there is no deflection and no opportunity for vibration between the positively and tightly clamped members, there is no opportunity for lateral movement or wear of said members.

Thus, as with airplane plates which have a special coating thereon to prevent undesirable weather effect, the area where the plates are clamped will remain intact, whereas with prior art devices wear has occurred and the metal detrimentally affected. Furthermore, while the invention has been shown and described in detail as to selected embodiments thereof, it will be understood that various other modifications and changes within the skill of persons versed in the art, may be made without departing from the spirit or scope of my invention.

As a feature of the invention, it is not amiss to point out that groove 33 as well as protuberances 31 are rectilinear and in consequence said protuberances will retain their seating in said groove when rotative force is applied to the stud. The protuberances will not leave the groove until the crown has been unscrewed sufficiently to enable the protuberances to be lifted from said groove by the exertion of the operator pushing on the stud in a direction longitudinally of said stud.

I claim:

1. A fastening device comprising a stud and socket, said stud having a head and a sleeve guiding portion with a shoulder at the end thereof nearest said head and a stem projecting from the other end, a protuberance projecting laterally from said stem at a distance from said sleeve guiding portion, a sleeve overlapping said sleeve guiding portion and extending toward said protuberance, and said socket having a threaded fixed cylinder and a threaded crown with the threads of the cylinder and crown interengaging and said crown having an end wall with inner and outer surfaces and a slot therethrough for insertion of the stud stem and protuberance through said wall to locate the protuberance adjacent to said outer surface, a projection on said outer surface for lateral engagement by said protuberance for rotating said crown, and resilient means pressing the end of the sleeve against said inner surface, rotation of the crown on the threaded interengagement with the fixed cylinder exerting an unyielding pressure longitudinally of the stud between said head and protuberance.

2. A fastening device comprising a stud and socket, said stud having progressively a head, a bearing portion, a sleeve guide and stem successively of smaller diameter, said stem having a protuberance remote from the sleeve guide, and said socket comprising a fixed cylinder and a rotatable crown having threaded interengagement, said fixed cylinder having a longitudinal bore therethrough and said crown having an end wall with an aperture admitting said stem and protuberance therein and permitting passage of the protuberance through said end wall to juxtaposition to the outer surface of said wall, a projection on said outer surface for lateral engagement by said protuberance for rotating said crown, and a coaxial sleeve on said stem having one end overlapping said sleeve guide, the outer diameters of said bearing portion and sleeve being equal to each other and substantially equal to the diameter of said longitudinal bore, and said sleeve having guiding engagement with the stem at the end of the sleeve remote from said end overlapping the sleeve guide cooperating with said sleeve guide for maintaining the sleeve coaxial to the stem, whereby the stud stem is guided to said aperture and the stud held coaxial to the cylinder bore.

3. A fastening device comprising a stud and socket, said stud having progressively a head, a bearing portion, a sleeve guide and stem successively of smaller diameter, said stem having a protuberance remote from the sleeve guide, and said socket comprising a fixed cylinder and a rotatable crown having threaded interengagement, said fixed cylinder having a longitudinal bore therethrough and said crown having an end wall with an aperture admitting said stem and protuberance therein and permitting passage of the protuberance through said end wall to juxtaposition to the outer surface of said wall, a projection on said outer surface for lateral engagement by said protuberance for rotating said crown, a coaxial sleeve on said stem having one end overlapping said sleeve guide, the outer diameters of said bearing portion and sleeve being equal to each other and substantially equal to the diameter of said longitudinal bore, and said sleeve having guiding engagement with the stem at the end of the sleeve remote from said end overlapping the sleeve guide cooperating with said sleeve guide for maintaining the sleeve coaxial to the stem, whereby the stud stem is guided to said aperture and the stud held coaxial to the cylinder bore, and resilient means around the stem and within said sleeve urging the sleeve toward said protuberance.

4. A fastening device comprising a stud and socket, said stud having progressively a head, a bearing portion, a sleeve guide and stem succesively of smaller diameter, said stem having a protuberance remote from the sleeve guide, and said socket comprising a fixed cylinder and a rotatable crown having threaded interengagement, said fixed cylinder having a longitudinal bore therethrough and said crown having an end wall with an aperture admitting said stem and protuberance therein and permitting passage of the protuberance through said end wall to juxtaposition to the outer surface of said wall, a projection on said outer surface for lateral engagement by said protuberance for rotating said crown, a coaxial sleeve on said stem having one end overlapping said sleeve guide, the outer diameters of said bearing portion and sleeve being equal to each other and substantially equal to the diameter of said longitudinal bore, and said sleeve having guiding engagement with the stem at the end of the sleeve remote from said end overlapping the sleeve guide cooperating with said sleeve guide for maintaining the sleeve coaxial to the stem, whereby the stud stem is guided to said aperture and the stud held coaxial to the cylinder bore, and resilient means around the stem and within said sleeve urging the sleeve toward said protuberance.

5. A fastening device comprising a stud and socket, said stud having a head and a sleeve guiding portion with a shoulder at the end thereof nearest said head and a stem projecting from the other end, a protuberance projecting laterally from said stem at a distance from said sleeve guiding portion, a sleeve overlapping said sleeve guiding portion and extending toward said protuberance, resilient means urging the sleeve toward the protuberance, and said socket comprising a fixed cylinder and a rotatable crown having threaded interengagement and said crown having an end wall with an aperture admitting said stem and protuberance therein and permitting passage of the protuberance through said end wall, means at the outside of said end wall for engagement by said protuberance and for obtaining forward rotation of said crown by rotation of the stud, and means in engagement with said crown for deterring unauthorized rotation of the crown.

6. A fastening device comprising a stud and socket comprising a pair of threaded hollow cylinders, one of said cylinders being stationary with a bore and open at both ends and the other said cylinder being rotatable and closed at one end, said stud having at one end a head and a cylindrical enlarged coaxial bearing portion and at its other end having an integrally connected smaller diameter stem, a cross bar providing protuberances projecting laterally from said stem, a slidable sleeve on said stem, and a spring in said sleeve for urging said sleeve against said closed cylinder end, and said cylinders overlapping and having threaded engagement one with the other coaxial to said stud, and the head of the stud being located outside of the end of the stationary cylinder remote from said overlapping threaded engagement, and said rotatable cylinder having a transverse slot admitting entry of said cross bar therethrough to rotatably over-ride said closed end of the rotatable cylinder, said end having a projection engageable by said cross bar to rotate said cylinder thereby moving the cylinder toward said protuberances of the cross bar and exert pressure against said protuberances and draw said head closer to said cylinder, and said cylindrical bearing portion adapted to provide for the stud positive lateral retention immediately adjacent the head of the stud by engagement of said cylindrical bearing portion with the surface of the bore of the stationary cylinder.

7. A fastening device comprising a stud having a shank and a cross-bar providing protuberances laterally from said shank, a sleeve on said shank, a socket comprising a pair of hollow cylinders, one said cylinder being stationary and the other cylinder being rotatable and said rotatable cylinder having an end wall, said cylinders being in threaded engagement and said wall having a transverse slot for passage of said cross-bar therethrough, thereby enabling said protuberances to over-ride said end wall, protruding means on said end wall in the path of rotation of said protuberances whereby rotation of the cross-bar rotates the rotatable cylinder on its said threaded engagement with the stationary cylinder, a spring in said sleeve urging the sleeve into engagement with said end wall, means for limiting retraction of the sleeve from said end wall while said protuberances over-ride said end wall, and means for deterring inadvertent backward rotation of said stud and protuberances away from said protruding means.

8. A fastening device comprising a stud having a cross-bar providing protuberances from said stud in an end portion of the stud, a socket having a hollow fixed cylinder externally threaded and a hollow rotatable cylinder internally threaded and in threaded engagement with the threads of said fixed cylinder, said rotatable cylinder having a predominatingly flat end wall integral therewith and perpendicular to the axis of the rotatable cylinder, said end wall having a transverse slot for passage of said cross-bar therethrough thereby enabling said cross-bar protuberances to over-ride the outer face of said end wall, a sleeve on said stud, and a spring on said stud encased by said sleeve, said sleeve being located beneath the cross-bar and adapted to engage the under face of said wall and retain said protuberances seated on the outer face of said wall while said protuberances are in over-riding position to the wall and in non-registering position to the slot.

9. A fastening device for clamping members together comprising a fixed cylinder adapted to be secured axially perpendicular to one of said members, said fixed cylinder being hollow with a through uninterrupted bore and open at both ends and having external screw threads, a rotatable cylinder overlapping said fixed cylinder and having internal screw threads engaging the external screw threads of the fixed cylinder, said rotatable cylinder having an end wall at its end away from the fixed cylinder and said end wall having a stud-receiving aperture, said rotatable cylinder having a multiplicity of serrations on its outer surface parallel to the axis of said rotatable cylinder and said serrations extending the whole length of said outer wall of said rotatable cylinder, a spring-loaded detent riding on said serrations, said detent having its serration-engaging end parallel to and contacting the serrations throughout the whole width of said end and admitting both rotatable and longitudinal movement of the rotatable cylinder with respect to said detent, and means for mounting the spring-loading of said detent.

10. A fastening device for clamping members together comprising a fixed cylinder adapted to be secured axially perpendicular to one of said members, said fixed cylinder being hollow with a through uninterrupted bore and open at both ends and having external screw threads, a rotatable cylinder overlapping said fixed cylinder and having internal screw threads engaging the external screw threads of the fixed cylinder, said rotatable cylinder having an end wall at its end away from the fixed cylinder and said end wall having a stud-receiving aperture, said rotatable cylinder having a multiplicity of serrations on its outer surface parallel to the axis of said rotatable cylinder and said serrations extending the whole length of said outer wall of said rotatable cylinder, a pair of spring-loaded detents riding on said serrations, each detent having its serration-engaging end parallel to and contacting the serrations throughout the whole width of said end and admitting both rotatable and longitudinal movement of the rotatable cylinder with respect to said detents, and means for mounting the spring-loading of said detents.

11. A fastening device for clamping members together comprising a fixed cylinder adapted to be secured axially perpendicular to one of said members, said fixed cylinder being hollow with a through uninterrupted bore and open at both ends and having external screw threads, a rotatable cylinder overlapping said fixed cylinder and having internal screw threads engaging the external screw threads of the fixed cylinder, said rotatable cylinder having an end wall at its end away from the fixed cylinder and said end wall having a stud-receiving aperture, said rotatable cylinder having a multiplicity of serrations on its outer surface parallel to the axis of said rotatable cylinder and said serrations extending the whole length of said outer wall of said rotatable cylinder, a pair of spring-loaded detents riding on said serrations, each detent having its serration-engaging end parallel to and contacting the serrations throughout the whole width of said end and admitting both rotatable and longitudinal movement of the rotatable cylinder with respect to said detents, and means for mounting the spring-loading of said detents, said detents being arranged so that while one is engaged in a valley of the serrations, the other engages a peak portion of a serration.

12. A fastening device for clamping members together, comprising a fixed hollow cylinder open at both ends and having external screw threads and cylindrical bore therein, a rotatable cylinder overlapping said fixed cylinder and having internal screw threads engaging the external screw threads of the fixed cylinder, said rotatable cylinder having a plurality of serrations disposed parallel to the cylinder axis on the outside wall of said rotatable cylinder, said rotatable cylinder having an end wall at its end away from the fixed cylinder and said end wall having a stud-receiving aperture, an outside casing secured to the fixed cylinder and surrounding both said cylinders and having an offset overlapping the said rotatable cylinder for preventing the rotatable cylinder from being completely unscrewed from the fixed cylinder, said outside casing having receiving and supporting means for spring-loaded detents, and a spring-loaded detent received and supported by said means in cooperative relation to said serrations.

13. A fastening device for clamping members together comprising a fixed cylinder adapted to be secured axially perpendicular to one of said members, said fixed cylinder being hollow with a through uninterrupted bore and open at both ends and having external screw threads, a rotatable cylinder overlapping said fixed cylinder and having internal screw threads engaging the external screw threads of the fixed cylinder, said rotatable cylinder having an end wall at its end away from the fixed cylinder and said end wall having a stud-receiving aperture, said rotatable cylinder having a multiplicity of serrations on its outer surface parallel to the axis of said rotatable cylinder and said serrations extending the whole length of said outer wall of said rotatable cylinder, a cap enclosing said cylinders and having a rabbet in peripheral direction on the outside thereof, a leaf spring having an end portion in said rabbet, said cap having an opening admitting the opposite end portion of said leaf spring to said serrations, said leaf spring having a detent in riding engagement with said serrations at all rotated and longitudinal positions of the said rotatable cylinder, and means holding said ends of the leaf spring in said rabbet fixed.

14. A fastening device for clamping members together comprising a fixed cylinder adapted to be secured axially perpendicular to one of said members, said fixed cylinder being hollow and having external screw threads, a rotatable cylinder overlapping said fixed cylinder and having internal screw threads engaging the external screw threads of the fixed cylinder and said end wall having a stud-receiving aperture, said rotatable cylinder having a multiplicity of serrations having straight sloping sides providing peaks and valleys parallel to the axis of said rotatable cylinder, and a spring-loaded detent riding on said serrations for deterring rotation of said rotatable cylinder.

15. A fastening device for clamping members together comprising a fixed cylinder adapted to be secured axially perpendicular to one of said members, said fixed cylinder being hollow and having external screw threads, a rotatable cylinder overlapping said fixed cylinder and having internal screw threads engaging the external screw threads of the fixed cylinder and said end wall having a stud-receiving aperture said rotatable cylinder having a multiplicity of serrations having rounded intersecting sides providing peaks and valleys parallel to the axis of said rotatable cylinder, and a spring-loaded detent riding on said serrations for deterring rotation of said rotatable cylinder.

16. A fastening device for clamping members together comprising a fixed cylinder adapted to be secured axially perpendicular to one of said members, said fixed cylinder being hollow and having external screw threads, a rotatable cylinder overlapping said fixed cylinder and having internal screw threads engaging the external screw threads of the fixed cylinder and said end wall having a stud-receiving aperture, said rotatable cylinder having a multiplicity of serrations having semi-cylindrical formation providing rounded sides and crests and intervening valleys parallel to the axis of said rotatable cylinder, and a spring-loaded detent riding on said serrations for deterring rotation of said rotatable cylinder.

17. A fastening device for clamping members together, comprising a stud and a socket element for receiving the same, said stud having lateral protuberances therefrom providing rectangular engaging surfaces and margins perpendicular to said surfaces, and a third element interposed between said stud and socket element, said socket element and third element having threaded interengagement and said third element having a rectangular groove at an end thereof with lateral walls perpendicular to the bottom of said groove and adapted to be engaged by said perpendicular margins of said protuberances whereby rotation of the stud with the protuberances in said groove effects positive rotation of said third element on said threaded engagement thereof with said socket element.

18. A fastening device for clamping members together, comprising overlapping elements of cylindrical character having interengaging screw threads, one of said elements having in an end thereof a groove with perpendicular side walls, and a stud with protuberances having side walls disposable in parallelism to and in driving engagement with said perpendicular side walls of said groove for applying rotative force from said stud to said element that has the groove.

19. A fastening device for clamping members together, comprising a rotatable stud having lateral protuberances, and a socket element for receiving said stud in coaxial assembled relation, in combination with a third element interposed coaxial to and opposite an end of said socket element between said end and said stud protuberances, said third element having means in conjunction with the stud and with the socket element for interlocking the stud with said third element and for detaining the third element from inadvertent rotation with respect to said socket element.

20. A fastening device for clamping members together, comprising a rotatable stud having lateral protuberances, and a socket element for receiving said stud, in combination with a third element interposed between said stud protuberances and socket element, said socket element and third element having interengaging screw threads for advancing and retracting said third element along said socket element, and said third element providing rigid releasable supporting engagement for and interlocking with said stud protuberances and effecting rotation of said third element by rotation of said stud and its protuberances.

21. A fastening device for clamping members together, comprising a rotatable stud having lateral protuberances, and a socket element for receiving said stud, said socket element having a threaded exterior, in combination with a hollow third element having a threaded interior engaging with the said threaded exterior of said socket element for advancing and retracting said third element along said socket element, and said third element providing rigid releasable supporting engagement for and interlocking with said stud protuberances and effective for rotating said third element by rotation of said stud and its protuberances.

22. A fastening device for clamping members together, comprising a rotatable stud having lateral protuberances, and a socket element for receiving said stud, in combination with a third and rotatable element interposed between said stud protuberances and socket element and extending around the sides of said socket element with screw thread engagement therewith for advancing and retracting said third element along said socket element, said third element providing rigid releasable supporting engagement for and interlocking with said stud protuberances and effecting rotation of said third element by rotation of said stud and its protuberances, and detaining means mounted nonrotatably from said socket element and projecting into contact with said third element for preventing inadvertent rotation of said third element.

References Cited in the file of this patent

FOREIGN PATENTS 599,641   Great Britain _____ Mar. 17, 1948